United States Patent
Jaffar et al.

(10) Patent No.: US 9,684,384 B2
(45) Date of Patent: Jun. 20, 2017

(54) SYSTEM AND METHOD FOR ELIMINATING SPURIOUS MOTION OF MOUSE

(71) Applicant: PixArt Imaging (Penang) SDN. BHD., Penang (MY)

(72) Inventors: Rizal Bin Jaffar, Penang (MY); Joon Chok Lee, Penang (MY); Kevin Len-Li Lim, Penang (MY)

(73) Assignee: PixArt Imaging (Penang) SDN. BHD., Penang (MY)

( * ) Notice: Subject to any disclaimer, the term of this patent is extended or adjusted under 35 U.S.C. 154(b) by 0 days.

(21) Appl. No.: 14/927,442

(22) Filed: Oct. 29, 2015

(65) Prior Publication Data
US 2017/0123511 A1    May 4, 2017

(51) Int. Cl.
| G06F 3/033 | (2013.01) |
| G06F 3/03 | (2006.01) |
| G06F 3/0354 | (2013.01) |
| G06F 3/038 | (2013.01) |

(52) U.S. Cl.
CPC ............ G06F 3/0317 (2013.01); G06F 3/038 (2013.01); G06F 3/03543 (2013.01)

(58) Field of Classification Search
CPC ... G06F 3/0317; G06F 3/0308; G06F 3/03543
USPC ................ 345/156, 157; 382/312; 250/208.1
See application file for complete search history.

(56) References Cited

U.S. PATENT DOCUMENTS

| 8,032,477 | B1* | 10/2011 | Hoffberg | .................. | G06N 7/06 706/52 |
| 8,907,889 | B2* | 12/2014 | Sweetser | ............... | G06F 3/0346 345/156 |
| 2005/0190158 | A1* | 9/2005 | Casebolt | ............... | G06F 3/0383 345/166 |
| 2006/0019679 | A1* | 1/2006 | Rappaport | ............ | H04W 64/00 455/456.5 |
| 2006/0022116 | A1* | 2/2006 | Wang | .................... | G06F 3/0317 250/208.1 |
| 2009/0195505 | A1* | 8/2009 | Chen | ..................... | G06F 1/3203 345/166 |

* cited by examiner

*Primary Examiner* — Calvin C Ma
(74) *Attorney, Agent, or Firm* — Winston Hsu

(57) ABSTRACT

A method for minimizing spurious motion of a mouse includes: determining whether the mouse enters a specific mode; and when the mouse is determined to enter the specific mode, generating a large correlation matrix by generating a standard size correlation matrix multiple times. The multiple standard size correlation matrices are offset with respect to each other so that an edge of each standard size correlation matrix touches at least an edge of another standard size correlation matrix to form the large correlation matrix. The specific mode is a skating mode wherein the mouse will move at high speed over a large area.

12 Claims, 5 Drawing Sheets

|   | A | B | C | D | E |
|---|---|---|---|---|---|
| (-6,-12) | (-6,-9) | (-6,-6) | (-6,-3) | (-6,0) | (-6,3) | (-6,6) | (-6,9) | (-6,12) |
| (-3,-12) | (-3,-9) | (-3,-6) | (-3,-3) | (-3,0) | (-3,3) | (-3,6) | (-3,9) | (-3,12) |
| (0,-12) | (0,-9) | (0,-6) | (0,-3) | (0,0) | (0,3) | (0,6) | (0,9) | (0,12) |
| (3,-12) | (3,-9) | (3,-6) | (3,-3) | (3,0) | (3,3) | (3,6) | (3,9) | (3,12) |
| (6,-12) | (6,-9) | (6,-6) | (6,-3) | (6,0) | (6,3) | (6,6) | (6,9) | (6,12) |

FIG. 3

SYSTEM AND METHOD FOR ELIMINATING SPURIOUS MOTION OF MOUSE

BACKGROUND OF THE INVENTION

1. Field of the Invention

The present invention relates to optical mouse sensors, and more particularly, to a method and system for an optical mouse which can eliminate spurious motion.

2. Description of the Prior Art

An optical mouse is a well-known component of computer systems. It works by generating a representation of cursor motion on a display using image correlation. The optical mouse captures images of a surface, and compares the captured images to determine displacement between the two.

If a first image is designated a reference (R) image and a second image is designated a comparison (C) image, the image correlation procedure offsets C against R and computes a sum of the product between the overlapping area of C and R by using a correlation matrix. The correlation matrix calculates the displacement between R and C by shifting C around R at a predicted point. FIG. 1 is an illustration of the reference image, comparison image and the correlation matrix. As shown in the diagram, the correlation matrix is a 3×3 matrix, wherein element 5 is at the centre, and the correlation matrix is placed at the centre of the reference image R. As illustrated in FIG. 2A, element 5 is calculated by making C overlap fully with R, and summing each overlapping pixel. As illustrated in FIG. 2B, element 2 is calculated by shifting C up by 1 pixel, and summing the overlapped area. As illustrated in FIG. 2C, element 9 is calculated by shifting C down 1 pixel and to the right 1 pixel, and summing each overlapping pixel.

Once all elements are calculated, a largest element of this matrix determined as the correlation peak and is used to generate the displacement. In the example shown in FIG. 2, if the mouse is stationary then element 5 will be the correlation peak (C and R are identical so the largest summed value will be at the centre of the correlation matrix). If the mouse is moving directly to the right then element 6 will be the correlation peak. The cursor motion is computed according to the correlation peak offset.

The 3×3 matrix is usually sufficient for standard computer applications. In gaming applications, however, the mouse speed is significantly faster than when performing operations such as word processing. A 'skating' motion is often used resulting in spurious motion (true motion of the mouse not corresponding to the cursor display) as the actual motion of the mouse is beyond the 3×3 matrix, meaning the largest element of the 3×3 matrix will not be the true correlation peak.

SUMMARY OF THE INVENTION

It is therefore an objective of the present invention to provide a method and system for accurately determining motion of the mouse during gaming applications.

The method for minimizing spurious motion of a mouse comprises: determining whether the mouse enters a specific mode; and when the mouse is determined to enter the specific mode, generating a large correlation matrix by generating a standard size correlation matrix multiple times. The multiple standard size correlation matrices are offset with respect to each other so that an edge of each standard size correlation matrix touches at least an edge of another standard size correlation matrix to form the large correlation matrix. The large correlation matrix is divided into a plurality of regions and a region is determined as a best region when it contains a correlation peak, wherein when a region is determined as the best region for a specific number of consecutive times, that region is used to generate motion of the mouse. The specific mode is a skating mode wherein the mouse will move at high speed over a large area. This mode can be set automatically by a user or the mouse or can be entered when it is determined that a previous frame captured by the mouse corresponds to the mouse being in a lifted position and a current frame captured by the mouse corresponds to the mouse being in a non-lifted position.

A mouse comprising a processing circuit is also disclosed. The processing circuit can perform an algorithm to minimize spurious motion of the mouse, wherein the algorithm performs the steps of: determining whether the mouse enters a specific mode; and when the mouse is determined to enter the specific mode, generating a large correlation matrix by generating a standard size correlation matrix multiple times. The multiple standard size correlation matrices are offset with respect to each other so that an edge of each standard size correlation matrix touches at least an edge of another standard size correlation matrix to form the large correlation matrix. The large correlation matrix is divided into a plurality of regions and a region is determined as a best region when it contains a correlation peak, wherein when a region is determined as the best region for a specific number of consecutive times, that region is used to generate motion of the mouse. The specific mode is a skating mode wherein the mouse will move at high speed over a large area. This mode can be set automatically by a user or the mouse or can be entered when it is determined that a previous frame captured by the mouse corresponds to the mouse being in a lifted position and a current frame captured by the mouse corresponds to the mouse being in a non-lifted position.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram of a larger correlation matrix according to an embodiment of the present invention.

DETAILED DESCRIPTION

Figure 1:
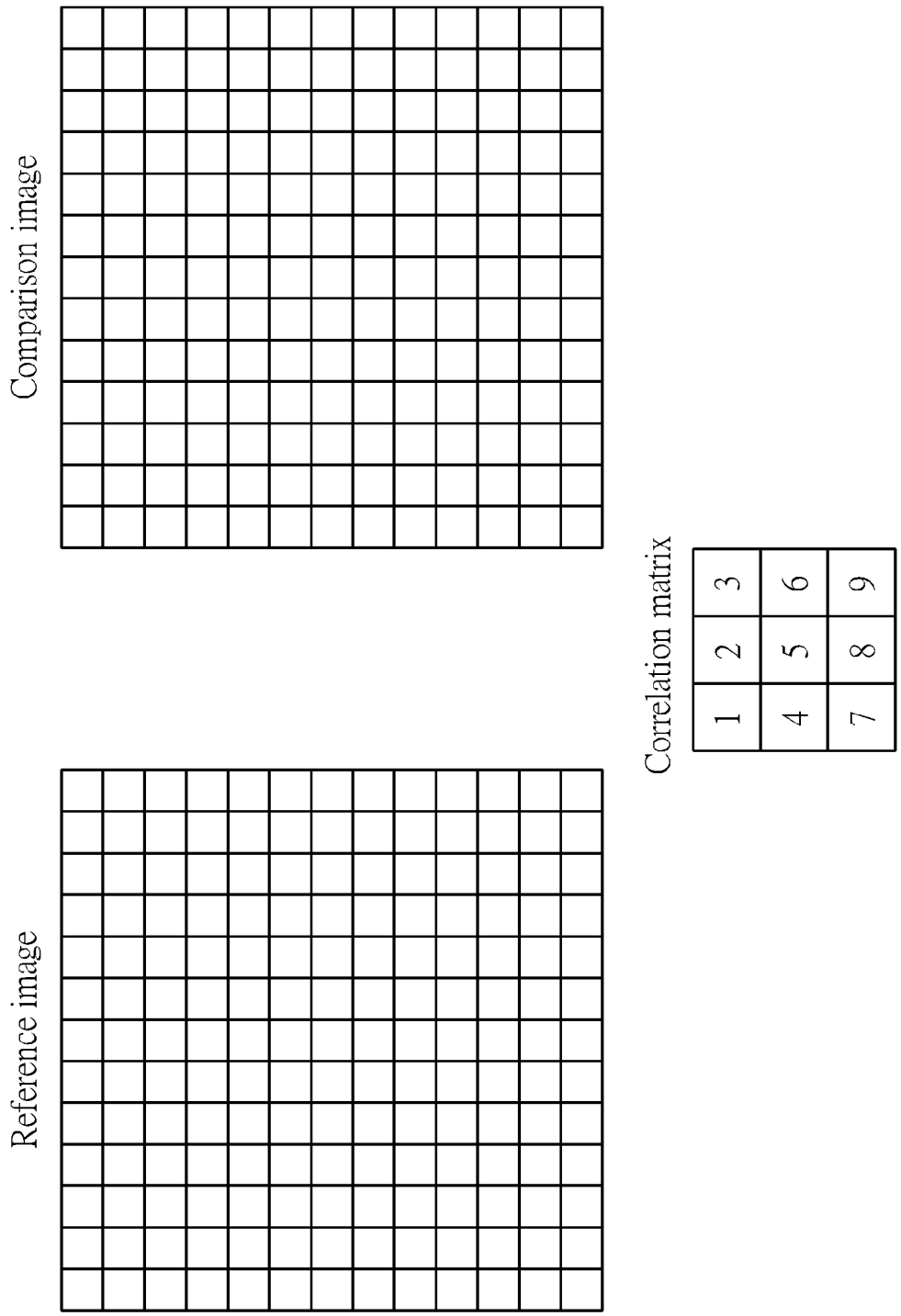
FIG. 1 is an illustration of a reference image, a comparison image, and a correlation matrix generated by an optical mouse.
Figure 2A:
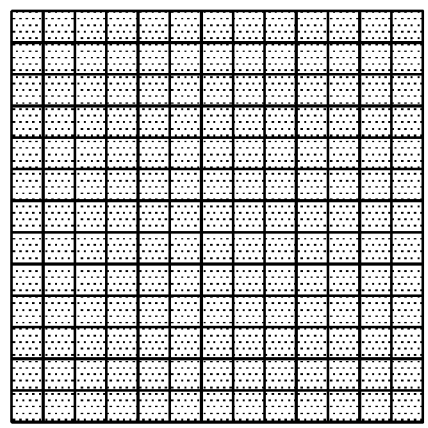
FIG. 2A is a diagram of calculating a first element of the correlation matrix in FIG. 1.
Figure 2B:
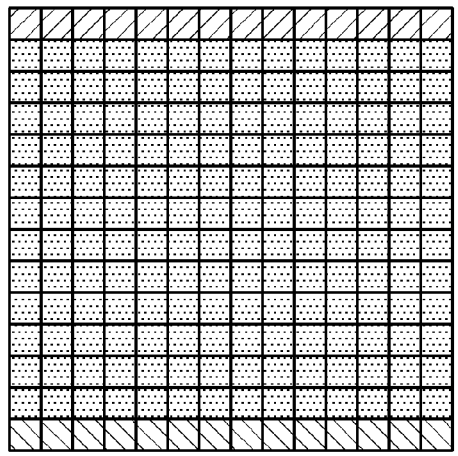
FIG. 2B is a diagram of calculating a second element of the correlation matrix in FIG. 1.
Figure 2C:
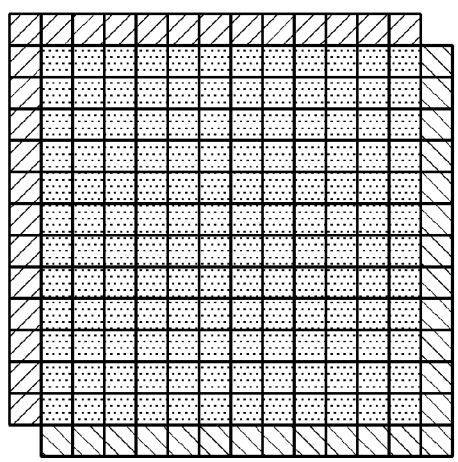
FIG. 2C is a diagram of calculating a third element of the correlation matrix in FIG. 1.

The objective of the present invention is to provide a correlation matrix which can accurately calculate a true correlation peak when an optical mouse is undergoing a skating motion. This is achieved by determining when the mouse is in 'skating mode' and generating a correlation matrix which has a larger surface than the standard 3×3 correlation matrix. The larger surface means that, even at high speed, the correlation match between images can be achieved.

The following will present the method of the present invention using a 15×27 matrix as an example. This matrix is merely an illustration, rather than a limitation, of the present invention, and other matrix sizes can be used. As high-speed horizontal (x direction) motion is more likely to occur than high-speed vertical (y direction) motion, however, it is advantageous for the matrix to be wider than it is long no matter what the chosen size. The following method can be performed by an optical mouse, such as the optical mouse illustrated in FIG. 5.

An illustration of the 15×27 matrix is provided in FIG. 3. The matrix is divided into five columns represented by the letters A~E. Note that C only corresponds to a single sub-column, whereas A, B, D and E each correspond to two sub-columns. After generating the larger matrix, one of the areas A~E will be selected as the best region, i.e. the region which contains the correlation peak. This best region can be detected a number of consecutive times in order to accurately determine the mouse motion. In the example illustrated in FIG. 4, the mouse has to determine a same region as the correlation peak for 20 consecutive times, but this is merely one example and not a limitation.

The entire 15×27 correlation matrix is generated by placing the original 3×3 matrix at the origin and then re-using this matrix to cover a larger area. Each re-used 3×3 matrix is spaced 3 pixels apart from a previous one so that the correlation surfaces butt against each other. Each box in the 15×27 matrix therefore represents a 3×3 correlation matrix, with the number in parentheses illustrating the offset from the original. Further, the present invention takes the 3×3 matrix as a conventional size, but it is also possible to generate the large correlation matrix using a repeated 2×2 matrix. In this case, the correlation matrix shown in FIG. 3 would be a 10×18 matrix and the offsets in the parentheses would be multiples of 2 so that column C would read (from top to bottom): (−4,0), (−2,0), (0,0), (2,0), (4,0). The upper limit of the larger correlation matrix is according to an area size on which the mouse is placed, and the lower limit of the matrix is according to a speed at which the mouse moves.

As the 15×27 matrix is generated using the standard method of generating the 3×3 matrix, the computing resources are simply reused multiple times and there is no need to implement new systems. In the example given in FIG. 3, the resources are reused 45 times. As these resources consume large amounts of power, the present invention can limit the method to only being initiated when the mouse is in skating mode. One way of determining that skating mode is initiated is when the mouse is landing, i.e. the mouse is placed on a surface from a lifted position, as this is a common move during gaming.

Figure 4:
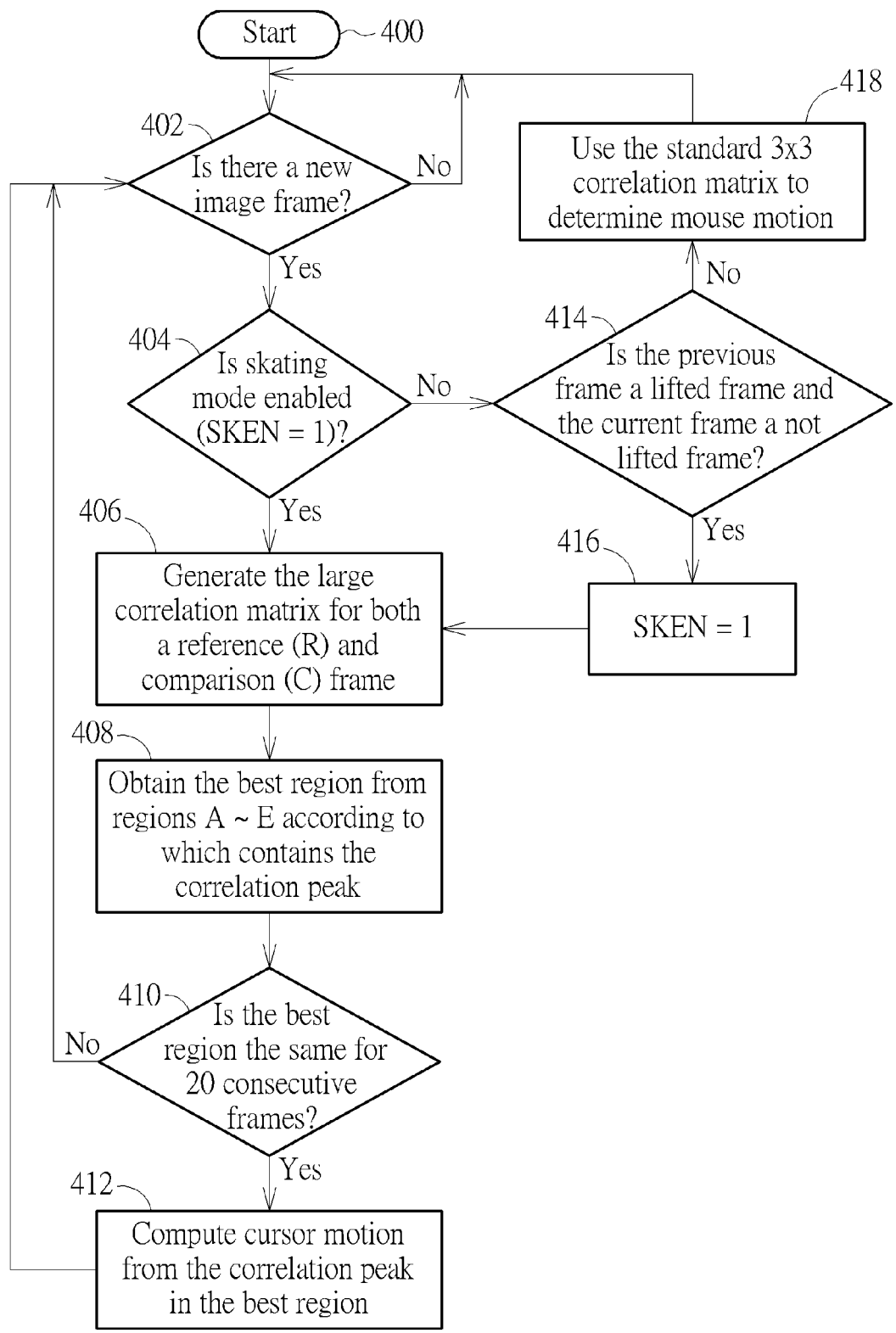
FIG. 4 is a flowchart illustrating a method of the present invention.

FIG. 4 is a flowchart illustrating the steps of the method. Note that other steps may be added. The description of each step is as follows:

Step 400: Start;

Step 402: Is there a new image frame? If yes, go to Step 404; if no, repeat Step 402;

Step 404: Is skating mode enabled (SKEN=1)? If yes, go to Step 406; if no, go to Step 414;

Step 406: Generate the large correlation matrix for both a reference (R) and comparison (C) frame;

Step 408: Obtain the best region from regions A~E according to which contains the correlation peak;

Step 410: Is the best region the same for 20 consecutive frames? If yes, go to Step 412; if no, return to Step 402;

Step 412: Compute cursor motion from the correlation peak in the best region; return to Step 402;

Step 414: Is the previous frame a lifted frame and the current frame a not lifted frame? If yes, go to Step 416; if no, go to Step 418;

Step 416: SKEN=1; go to Step 406;

Step 418: Use the standard 3×3 correlation matrix to determine mouse motion; return to Step 402.

Skating mode (SKEN=1) can be set by a user or by the system, so that the mouse will automatically generate the larger correlation matrix. In order to further save resources, the system can limit skating mode to be dynamically enabled only when it is determined that the mouse is landing. This is described in Step 414. As an optical mouse can determine a distance from a surface, the mouse is also able to determine whether it is in a lifted position (not contacting the surface) or a non-lifted position (contacting the surface). When it is determined the previous frame was captured when the mouse was in a lifted position and the current frame is captured when the mouse is in a non-lifted position, the mouse can enter a skating mode, i.e. SKEN=1.

Figure 5:
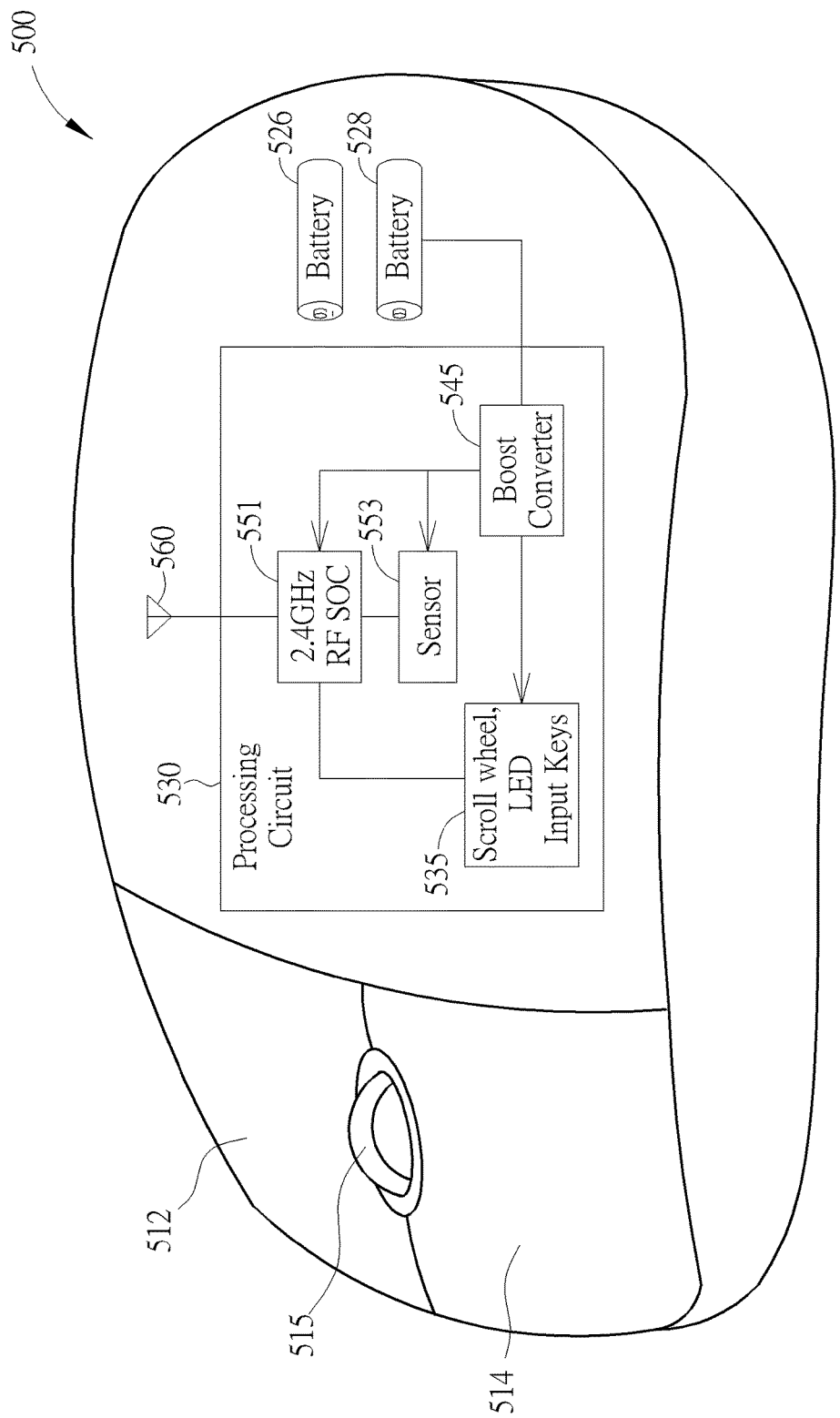
FIG. 5 is a diagram illustrating an optical mouse according to an embodiment of the present invention.

FIG. 5 is a diagram illustrating an optical mouse 500 which performs the method detailed above. The optical mouse 500 comprises an optical sensor (not shown) on the base of the body. The top of the optical mouse 500 comprises input keys 512, 514, and a scroll wheel 515. The optical mouse 500 is powered by batteries 526, 528. The optical mouse further comprises an antenna 560. The antenna 560 and the batteries 526, 528 are coupled to a processing circuit 530. The processing circuit 530 comprises a 2.4 GHz wireless transceiver 551, a sensor 553, a boost converter 545 and a scroll wheel, LED and input key circuit 535. The processing circuit 530 can generate the large correlation matrix by generating a standard size correlation matrix multiple times, as detailed in the above description. The processing circuit 530 further determines when the skating mode can be entered by determining that a previous frame captured by the mouse corresponds to the mouse being in a lifted position and a current frame captured by the mouse corresponds to the mouse being in a non-lifted position. Moreover, the processing circuit 530 can execute an algorithm which divides the large correlation matrix into a plurality of regions and determines a region as a best region when it contains a correlation peak. The operations performed by the processing circuit 530 of the optical mouse 500 can be realised by one skilled in the art after reading the above paragraphs.

The above embodiments are presented for a better understanding of the invention. It should be obvious to one skilled in the art that the concept of the invention is not limited to these specific examples. The objective of the proposed method is to determine when the mouse enters a skating mode corresponding to a gaming motion, which can be determined by an automatic setting or by determining a previous frame was captured when the mouse was in a lifted position and the current frame is captured when the mouse is in a non-lifted position. Once the skating mode is entered, the mouse will generate a larger correlation matrix using a standard correlation matrix and repeating the matrix many times. The larger correlation matrix is divided into regions. When a particular region is determined as a best region (i.e. it contains the correlation peak) for a consecutive number of times, that region is used to accurately generate a motion of the mouse on a computer display.

Those skilled in the art will readily observe that numerous modifications and alterations of the device and method may be made while retaining the teachings of the invention.

Accordingly, the above disclosure should be construed as limited only by the metes and bounds of the appended claims.

what is claimed is:

1. A method for minimizing spurious motion of a mouse, comprising:
   determining whether the mouse enters a specific active mode different from a normal active mode; and
   when the mouse is determined to enter the specific active mode, generating a large correlation matrix by generating a standard size correlation matrix used for a normal active mode multiple times, wherein the multiple standard size correlation matrices are offset with respect to each other so that an edge of each standard size correlation matrix touches at least an edge of another standard size correlation matrix to form the large correlation matrix, and the multiple standard size correlation matrices are generated around an initially generated standard size correlation matrix so that the initially generated standard size correlation matrix is an origin of the large correlation matrix.

2. The method of claim 1, wherein the specific active mode is a skating mode wherein the mouse will move at high speed over a large area.

3. The method of claim 2, wherein the skating mode can be set automatically by a user or the mouse.

4. The method of claim 2, wherein the skating mode can be entered when it is determined that a previous frame captured by the mouse corresponds to the mouse being in a lifted position and a current frame captured by the mouse corresponds to the mouse being in a non-lifted position.

5. The method of claim 1, further comprising:
   dividing the large correlation matrix into a plurality of regions; and
   determining a region as a best region when it contains a correlation peak.

6. The method of claim 5, wherein when a region is determined as the best region for a specific number of consecutive times, that region is used to generate motion of the mouse.

7. A mouse comprising a processing circuit, wherein the processing circuit can perform an algorithm to minimize spurious motion of the mouse, the algorithm performing the following steps:
   determining whether the mouse enters a specific active mode different from a normal active mode; and
   when the mouse is determined to enter the specific active mode, generating a large correlation matrix by generating a standard size correlation matrix multiple times, wherein the multiple standard size correlation matrices are offset with respect to each other so that an edge of each standard size correlation matrix touches at least an edge of another standard size correlation matrix to form the large correlation matrix, and the multiple standard size correlation matrices are generated around an initially generated standard size correlation matrix so that the initially generated standard size correlation matrix is an origin of the large correlation matrix.

8. The mouse of claim 7, wherein the specific active mode is a skating mode wherein the mouse will move at high speed over a large area.

9. The mouse of claim 8, wherein the skating mode can be set automatically by a user or the mouse.

10. The mouse of claim 8, wherein the skating mode can be entered when it is determined that a previous frame captured by the mouse corresponds to the mouse being in a lifted position and a current frame captured by the mouse corresponds to the mouse being in a non-lifted position.

11. The mouse of claim 7, wherein the algorithm further performs the following steps:
    dividing the large correlation matrix into a plurality of regions; and
    determining a region as a best region when it contains a correlation peak.

12. The mouse of claim 11, wherein when a region is determined as the best region for a specific number of consecutive times, that region is used to generate motion of the mouse.

* * * * *